(12) United States Patent
Tao et al.

(10) Patent No.: US 12,455,377 B2
(45) Date of Patent: Oct. 28, 2025

(54) SYSTEM AND METHOD FOR CAPTURING MOVEMENT TRAJECTORIES OF PARTICULATE MATTER

(71) Applicant: Peking University, Beijing (CN)

(72) Inventors: Shu Tao, Beijing (CN); Xin He, Beijing (CN); Shuxiu Zheng, Beijing (CN); Heng Zhang, Beijing (CN); Xiaoqiao Jiao, Beijing (CN); Guofeng Shen, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 856 days.

(21) Appl. No.: 17/660,825

(22) Filed: Apr. 26, 2022

(65) Prior Publication Data

US 2023/0258803 A1 Aug. 17, 2023

(30) Foreign Application Priority Data

Feb. 14, 2022 (CN) .......................... 202210131678.8

(51) Int. Cl.
| | |
|---|---|
| *G01S 17/58* | (2006.01) |
| *G01S 7/481* | (2006.01) |
| *G01S 17/86* | (2020.01) |
| *G06T 7/246* | (2017.01) |

(52) U.S. Cl.
CPC ............ *G01S 17/58* (2013.01); *G01S 7/4815* (2013.01); *G01S 17/86* (2020.01); *G06T 7/246* (2017.01); *G06T 2207/30241* (2013.01)

(58) Field of Classification Search
CPC ........... G06T 2207/30241; G06T 7/246; G01S 17/58; G01S 17/86; G01S 7/4815; G01N 15/06; G01N 15/075; G01N 2015/0046
See application file for complete search history.

(56) References Cited

U.S. PATENT DOCUMENTS

| | | | | |
|---|---|---|---|---|
| 10,690,754 B2 * | 6/2020 | Pei | ........................... | G01S 7/497 |
| 2019/0301857 A1 * | 10/2019 | Cossairt | .................. | G01S 17/86 |
| 2023/0100657 A1 * | 3/2023 | Li | .......................... | G01S 17/931 |
| | | | | 356/4.01 |
| 2023/0113016 A1 * | 4/2023 | Bucknell | ................... | A63J 1/00 |
| | | | | 348/239 |

FOREIGN PATENT DOCUMENTS

| | | | | | |
|---|---|---|---|---|---|
| CN | 110274855 | * | 6/2020 | ............. | G01N 15/06 |
| CN | 110274855 B | * | 6/2020 | ............. | G01N 15/06 |

* cited by examiner

*Primary Examiner* — Hina F Ayub

(74) *Attorney, Agent, or Firm* — Knobbe, Martens, Olson & Bear LLP

(57) ABSTRACT

The present disclosure relates to a system and method for capturing movement trajectories of particulate matter. The system includes: micro lidar measurement equipment and a camera. The micro lidar measurement equipment includes: a laser device, a pitching platform, and a protective casing for the laser device, and the laser device is located on the pitching platform. The laser device is configured to emit a laser. The camera is configured to shoot the laser, determine particulate matter concentrations according to a grayscale of pixels and a height of the pixels in a photo shoot, and compare differences in spatial distribution of particulate matter concentrations at different time to obtain the movement trajectories of the particulate matter.

6 Claims, 11 Drawing Sheets

SYSTEM AND METHOD FOR CAPTURING MOVEMENT TRAJECTORIES OF PARTICULATE MATTER

CROSS REFERENCE TO RELATED APPLICATIONS

This patent application claims the benefit of and priority to Chinese Patent Application No. 202210131678.8, filed on Feb. 14, 2022, the disclosure of which is expressly incorporated by reference herein in its entirety as part of the present application.

TECHNICAL FIELD

The present disclosure relates to the field of air particulate matter concentration measurement, and in particular, relates to a system and method for capturing movement trajectories of particulate matter.

BACKGROUND ART $PM_{2.5}$ refers to particulate matter with an aerodynamic diameter less than or equal to 2.5 microns, which can directly penetrate into the respiratory tract and lungs of the human body, and has been shown to be potentially associated with many diseases (such as respiratory, neurological, and reproductive system diseases). Global exposure to $PM_{2.5}$ causes more than one million premature deaths each year. Studies have shown that human activities such as smoking, cooking, cleaning, using solid fuels, and burning incense can cause serious particulate matter pollution.

It should be pointed out that particulate matter concentrations are affected by factors such as the location of pollution sources, human activity disturbances, convection and diffusion. Therefore, the concentration distribution of $PM_{2.5}$ in the entire three-dimensional (3D) space is not uniform and change rapidly with time.

The main limitation of traditional methods for measuring the particulate matter concentrations (such as impact weighing method) is that the observation position is fixed. However, results obtained by this single-point observation method not only are poorly representative, but also cannot provide information on the spatial distribution and dynamic variation of particulate matter pollution.

In recent years, some studies have attempted to use low-cost sensor arrays to measure the temporal and spatial distribution of the particulate matter concentrations. The low-cost sensors can capture $PM_{2.5}$ concentration information with high temporal resolution. However, the low-cost sensor arrays have poor measurement accuracy and repeatability, and the error of equipment calibration one by one is large. In addition, the sensor arrays can only cover concentration changes at several discrete points in space, and its high spatial resolution observation is limited by the equipment placement conditions.

In addition, the lidar technology is also gradually applied to the study of the temporal and spatial distribution of the particulate matter, especially in the vertical height analysis of the particulate matter. Through the scattering of the laser by the particulate matter, a particulate matter concentration profile on a vertical profile of the atmosphere can be obtained based on forward, backward, or lateral scattering measurements. Recently, a charge-coupled device (CCD)-laser system for monitoring air particulate matter provides a new technology that can be specially applied to indoor $PM_{2.5}$ monitoring, which can obtain $PM_{2.5}$ variations in vertical profiles. However, this type of technology cannot describe multi-dimensional dynamic changes, and due to the asphericity of the particulate matter, there is great uncertainty in the quantitative relationship between the scattered laser signal, the pixel grayscale, and the particulate matter mass concentration, which restricts the practicability of this technology in accurately quantifying the particulate matter concentrations and health exposure risk assessment.

The velocity vector of the particulate matter can be measured using particle image velocimetry (PIV). This technology uses one or more cameras to capture the scattering signals of sheet laser (2D-PIV) or volume laser (3D-PIV) by tracer particles in the flow field, and uses a complex cross-correlation algorithm to process two consecutive exposure images, and the fluid velocity field is obtained through point-to-point processing. However: 1. This technology focuses on obtaining airflow velocity information, and cannot obtain real-time quantitative information on distribution of the particulate matter concentrations in the flow field. 2. In this technology, the particulate matter plays a tracer role (the density of tracer particles introduced needs to be similar to the density of the flow field so as not to interfere with the flow of the flow field), and this feature is not suitable for exploring the motion law of particulate matter with other particle sizes (such as $PM_{10}$ and total suspended particulate matter). 3. The sheet laser can only obtain two-dimensional (2D) plane information, and it is difficult to restore the 3D dynamic process from the volume laser data. 4. The construction of sheet/volume lasers and multiple camera systems, and the coordination of complex algorithms increase the cost and operational difficulty of this technology.

The present disclosure designs a system for "simultaneously quantifying multi-dimensional dynamic change characteristics of particulate matter". Using this system and its algorithm, the 3D distribution characteristics of the particulate matter concentrations can be obtained, and the movement trajectory characteristics of the particulate matter can be obtained according to the temporal change information of the concentration field, which can reflect the four-dimensional (4D) temporal and spatial changes of the particulate matter after being heated or affected by wind, revealing the diffusion or removal mechanism.

SUMMARY

An objective of the present disclosure is to provide a system and method for capturing movement trajectories of particulate matter, which can dynamically display 3D temporal and spatial dynamic changes of particulate matter concentrations in real time, and can improve the detection accuracy.

In order to achieve the above objective, the present disclosure provides the following technical solutions:

A system for capturing movement trajectories of particulate matter is provided, including:

micro lidar measurement equipment and a camera.

The micro lidar measurement equipment includes: a laser device, a pitching platform, and a protective casing for the laser device, and the laser device is located on the pitching platform.

The laser device is configured to emit a laser.

The camera is configured to shoot the laser, and determine particulate matter concentrations according to a grayscale of pixels and a height of the pixels in a photo shoot.

Optionally, a plurality of laser devices may be arranged to form a laser array.

Optionally, the system may further include: a black background cloth, and the black background cloth may be located behind and above the laser array.

Optionally, the system may further include: on-line particulate matter (PM) sensors, vertically placed at four vertices of the laser array.

Optionally, the laser device may have a wavelength of 532 nm.

Optionally, the camera may be a complementary metal oxide semiconductor (CMOS) camera.

Based on the above system in the present disclosure, the present disclosure also provides a method for capturing movement trajectories of particulate matter, including:

obtaining scattered light images of the particulate matter by a camera;

performing calibrations to the scattered light images of the particulate matter;

extracting grayscales at different heights in a laser light path from the calibrated scattered light images of the particulate matter;

building a particulate matter concentration prediction model;

predicting particulate matter concentrations based on the particulate matter concentration prediction model; and determining the movement trajectories of the particulate matter based on differences in spatial distribution of particulate matter concentrations at different times.

Optionally, an expression of the particulate matter concentration prediction model may be as follows:

$$C = p_0 + p_1 \times H + p_2 \times G + p_3 \times (H)^2 + p_4 \times H \times G.$$

C represents the particulate matter concentration, H represents an attenuation distance, G represents the grayscale, and $p_0$, $p_1$, $p_2$, $p_3$ and $p_4$ are all constants.

According to the specific embodiments provided by the present disclosure, the present disclosure discloses the following technical effects:

The above system in the present disclosure detects the particulate matter concentrations by arranging the micro lidar measurement equipment and the camera. The micro lidar measurement equipment includes: the laser device, the pitching platform, and the protective casing for the laser device, and the laser device is located on the pitching platform. A plurality of laser devices are arranged to form a laser array. The laser device is configured to emit a laser. The camera is configured to shoot the laser, determine the particulate matter concentrations according to a grayscale of pixels and a height of the pixels in a photo shoot, and compare differences in spatial distribution of particulate matter concentrations at different times to obtain the movement trajectories of the particulate matter. The above system and method in the present disclosure can monitor the movement trajectories of the particulate matter in real time, and can greatly improve the detection accuracy.

BRIEF DESCRIPTION OF THE DRAWINGS

To describe the embodiments of the present disclosure or the technical solutions in the prior art more clearly, the accompanying drawings required in the embodiments are briefly introduced below. Obviously, the accompanying drawings described below are only some embodiments of the present disclosure. Those of ordinary skill in the art may further obtain other accompanying drawings based on these accompanying drawings without creative efforts.

DETAILED DESCRIPTION OF THE EMBODIMENTS

The technical solutions in the embodiments of the present disclosure will be described below clearly and completely with reference to the accompanying drawings in the embodiments of the present disclosure. Apparently, the described embodiments are merely some rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide a system and method for capturing movement trajectories of particulate matter, which can dynamically display 3D temporal and spatial dynamic changes of particulate matter concentrations in real time, and can improve the detection accuracy.

To make the above objective, features, and advantages of the present disclosure clearer and more comprehensible, the present disclosure will be further described in detail below in conjunction with the accompanying drawings and specific implementations.

The present disclosure designs and develops a set of micro lidar measurement equipment, that is, an on-line measurement system for particulate matter concentrations, and the main components include a laser device, a pitching platform, a power supply, and a protective casing for the laser device. The pitching platform that can adjust the emission angle of the laser device is placed below the laser device, and integrated into a black box of 10×5×10 cm together with the control power circuit board. The micro instrument is small, portable, and easy to operate.

Figure 1:
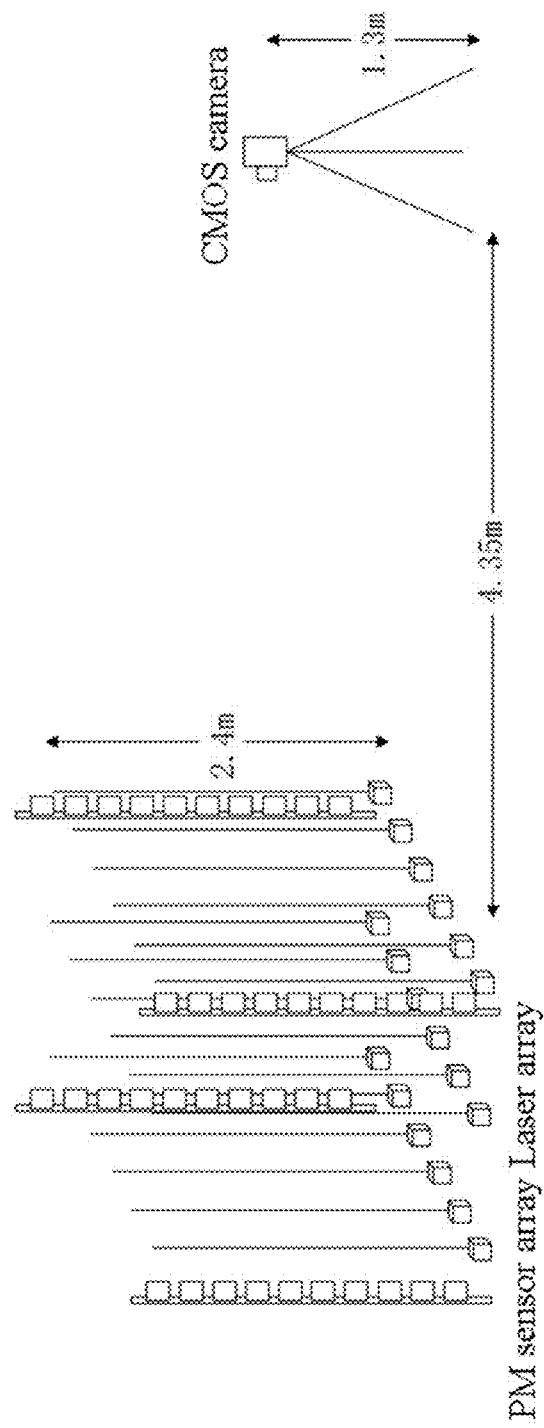
FIG. 1 is a schematic structural diagram of a system for capturing movement trajectories of particulate matter according to an embodiment of the present disclosure.
Figure 2:
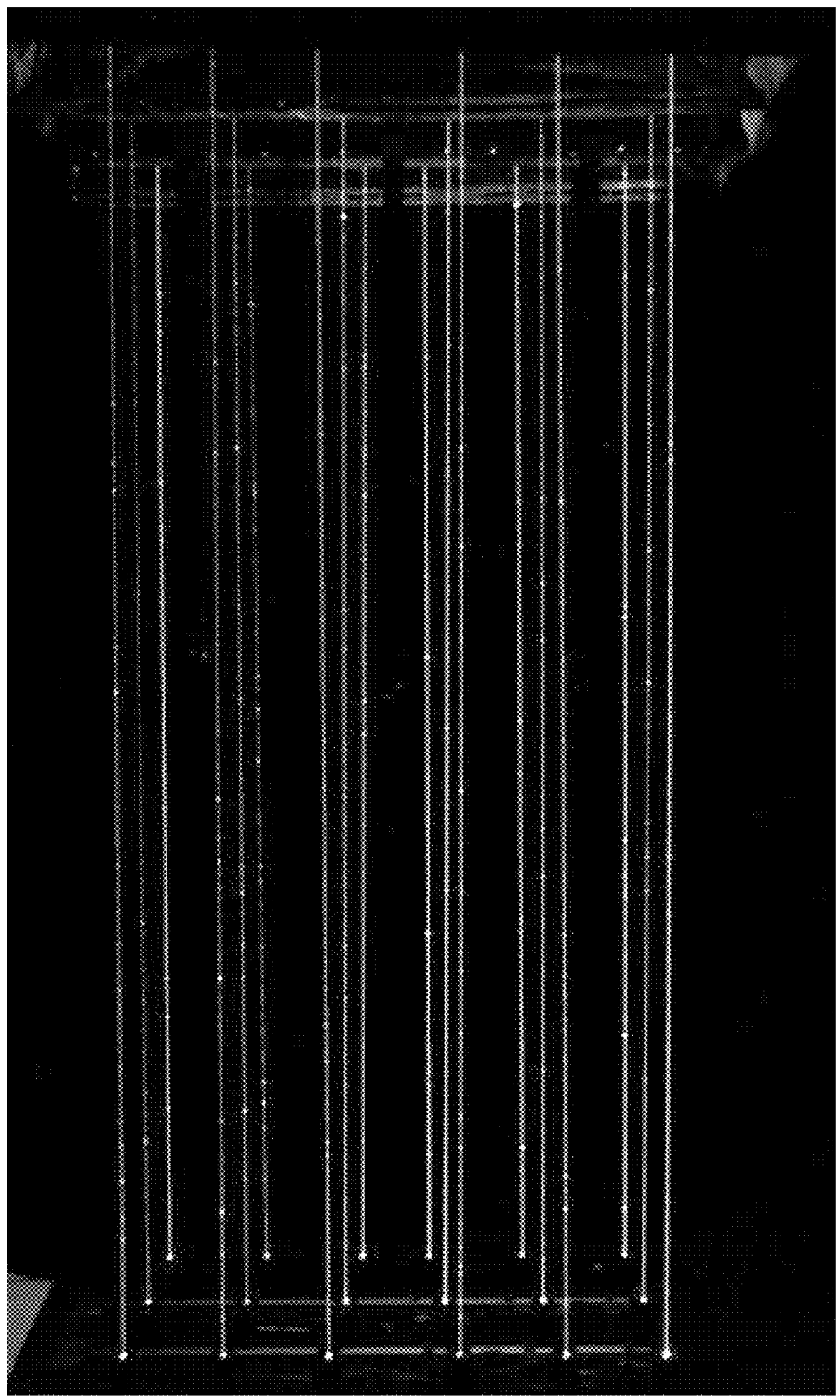
FIG. 2 is an effect diagram of an image obtained by the system according to the embodiment of the present disclosure.
Figure 3:
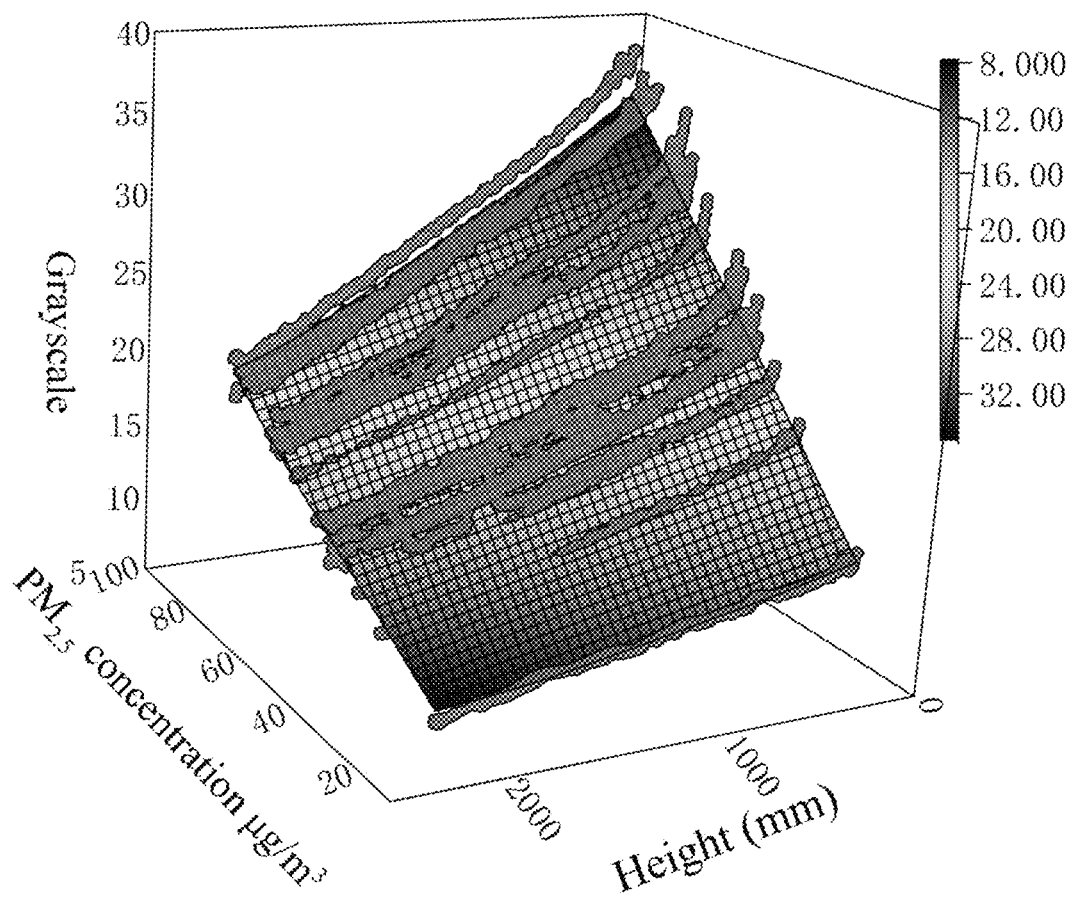
FIG. 3 is a schematic diagram of a standard calibration surface for $PM_{2.5}$ concentration prediction according to the embodiment of the present disclosure.

As shown in FIG. 1, 18 micro laser devices are arranged in a matrix shape of 3 rows×6 columns, placed on the ground, and emit lasers vertically upwards. The laser devices in each row are 20 cm apart, and the two columns are 80 cm apart. The CMOS camera is placed 4.35 m away from the front end of the laser matrix, and the camera is 1.3 m above the ground. The camera is placed on the center line of the lasers in the 3rd and 4th columns to avoid the occlusion of the beams of the laser array, which will affect the shooting quality. FIG. 2 is an effect diagram after shooting by the camera.

The system also includes 4 columns of on-line PM sensors, vertically placed at four vertices of the laser array, such that the system has the function of simultaneously obtaining laser inversion data and the measured concentration data of the PM sensor. A black background cloth is arranged behind and above the laser matrix to reduce the influence of stray light generated by wall diffuse reflection on the main light path.

Specific operations of the system are as follows.

The micro lidar array is turned on, and relevant parameters of the camera (aperture, focal length, exposure time, etc.) are adjusted, such that the image shoot when the laser is turned on will not be too dark or saturated. The shooting time can be adjusted according to the needs. Taking the smoking experiment as an example, 200 frames of images (with an exposure time of 1 s) can be shoot to obtain the movement information of the particulate matter in the smoking scene, and the shooting files are stored as .raw files.

The image processing step of the system is as follows.

Before image data extraction, the background value is subtracted from the experimental image shoot by the CMOS camera. The laser in this experiment is a Gaussian laser, and the intensity distribution on the longitudinal section approximates normal distribution. Therefore, when laser grayscales at different heights are read, the pixel coordinate with the largest grayscale is taken as the midpoint, the grayscales in 2 pixels are taken on the left and right (the width of each laser in this experiment is focused within 5 pixels), the grayscales of these 5 pixels are averaged to be taken as the grayscale data of the laser at this height, and the grayscale sequence of the entire laser can be obtained by calculating each height. The grayscale matrix of the entire laser matrix can be obtained by calculating each laser. Finally, the time series data of the grayscale of the laser matrix can be obtained by calculating the laser brightness on each frame of the picture.

After the above data is obtained, $PM_{2.5}$ concentration calibration and prediction are performed as follows.

A higher $PM_{2.5}$ concentration will produce a larger scattering intensity of the laser, which in turn will present a larger grayscale in the CMOS camera. In this study, it is hoped that the grayscale can only reflect the $PM_{2.5}$ concentration. However, there are many non-concentration factors that will also affect the grayscale, so they need to be calibrated.

They mainly include angle calibration and distance calibration. Since the distribution range of the scattering angle in this device is narrow (90±15°), and it is in the exponentially attenuation smooth segment of the phase function under the experimental conditions, the angle calibration can be ignored, and the following discussions focus on the distance calibration.

There is an exponential attenuation phenomenon when the laser transmit in the air, and thus the grayscale (G) in the present disclosure is affected not only by the $PM_{2.5}$ concentration (C), but also by the laser attenuation distance (H, the laser is emitted from the ground, and thus the attenuation distance is the height). A relationship equation between G, C, and H is fitted by the data of the following calibration experiment. A general formula of the relationship equation is:

$$C = p_0 + p_1 \times H + p_2 \times G + p_3 \times (H)^2 + p_4 \times H \times G \quad (1).$$

C represents the particulate matter concentration, H represents the attenuation distance, G represents the grayscale, and $p_0$, $p_1$, $p_2$, $p_3$ and $p_4$ are all constants.

Calibration experiment process: under the condition of stable outdoor particulate matter pollution, the indoor $PM_{2.5}$ concentration can be regarded as a constant value. Therefore, in the present disclosure, 37 different outdoor pollution degrees are selected to naturally form 37 different indoor pollution concentrations. At each indoor pollution concentration ($C_k$, k=1-37, measured by the PM sensor), the laser matrix is turned on and the grayscales ($G_{ijk}$, i=1-582, j=1-18, k=1-37) at each height ($H_{ijk}$, i=1-582, j=1-18, k=1-37) are recorded by the camera (after interpolation, each laser occupies 582 pixels on the camera). For each laser (j=1-18), 582×37 pairs of ($C_k$, $G_{ijk}$, and $H_{ijk}$ data are used to fit Equation (1) to finally form 18 standard fitting equations. The coefficients of 18 standard fitting equations are shown in the table below.

TABLE 1

Coefficients of standard fitting equations

| $p_0$ | $p_1$ | $p_2$ | $p_3$ | $p_4$ |
|---|---|---|---|---|
| 11.42 | −0.00342 | 2.036 | 1.74E−06 | 0.0007218 |
| 8.031 | 0.001924 | 2.68 | 6.19E−07 | 0.001001 |
| 0.7898 | −0.00733 | 1.806 | 2.88E−06 | 0.00069 |
| −5.284 | −0.00811 | 2.586 | 3.32E−06 | 0.000908 |
| −6.106 | −0.00535 | 2.935 | 2.20E−06 | 0.001011 |
| −5.895 | −0.00549 | 2.484 | 1.95E−06 | 0.000973 |
| 8.225 | −0.00089 | 2.52 | 1.16E−06 | 0.001244 |
| 9.337 | −0.00303 | 2.451 | 1.95E−06 | 0.00112 |
| 2.546 | −0.0055 | 2.507 | 2.48E−06 | 0.001078 |
| −3.675 | −0.00655 | 1.933 | 2.50E−06 | 0.000791 |
| 5.409 | −0.0056 | 3.26 | 2.57E−06 | 0.001213 |
| 1.362 | −0.00649 | 2.239 | 2.08E−06 | 0.001261 |
| 7.724 | −0.00261 | 1.89 | 1.68E−06 | 0.001084 |
| 11.04 | −0.00088 | 1.807 | 9.96E−07 | 0.000999 |
| 4.727 | −0.00592 | 2.022 | 2.60E−06 | 0.001127 |
| 0.8363 | −0.01325 | 2.119 | 4.62E−06 | 0.001099 |
| 3.079 | −0.00632 | 2.231 | 2.32E−06 | 0.001266 |
| 1.511 | −0.01772 | 1.885 | 5.57E−06 | 0.001174 |

Acquisition of measured data concentration: the formal experiment is performed in the case of no obvious outdoor pollution. The grayscales (Gabe, a=1-582, b=1-18, c=1-n, and n is the number of shooting photo frames) at each height of the 18 lasers are recorded by the camera. For a certain frame of photo, the grayscale (Gabe, a=1-582, b=1-18, c=1) at different heights of each laser and the height data ($H_{abc}$, a=1-582, b=1-18, c=1) at the corresponding position are substituted into the standard fitting equations of 18 lasers respectively to obtain the $PM_{2.5}$ concentration in this frame of pictures ($C_{abc}$, a=1-582, b=1-18, c=1). The 3D $PM_{2.5}$ concentration field data can be obtained by correlating the $PM_{2.5}$ concentration data at the corresponding position with the spatial coordinates.

By comparing the differences in the spatial distribution of the $PM_{2.5}$ concentration field at different times, the movement trajectories of the particulate matter are obtained.

The spatial concentration data after the above processing is correlated with the spatial coordinates, then appropriate points of the data are selected for interpolation and smoothing and denoising processing, and finally the concentration data in the space is displayed by using a pseudo-color image. The 3D drawing in the present disclosure adopts the volume rendering method, and the experimental time corresponding to each frame of the moving picture is displayed in the form of a clock and time numbers below.

The following is the result analysis and accuracy verification.

Figure 4:
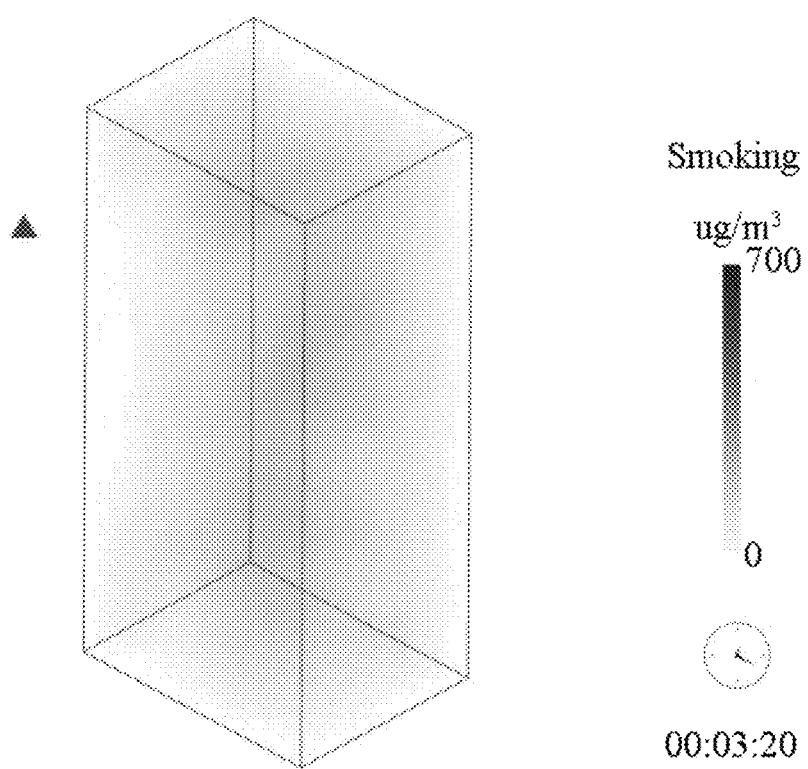
FIG. 4 is an effect diagram of temporal and spatial changes of $PM_{2.5}$ concentration in a smoking scene according to the embodiment of the present disclosure.

The smoking test results are shown in FIG. 4 (Note: FIG. 5 can be accessed from the following link:
https://disk.pku.edu.cn:443/link/
1A7945BAD3E53B497EB6181A2631EA04).

During smoking, the particulate matter concentrations are not uniformly distributed in the 3D space, and have very fast dynamic changes with time. The movement trajectories of the particulate matter is that the particulate matter at the smoking source (red triangle) is heated and rises, and diffuses obliquely downward under the influence of gravity. After the smoking is over, the particulate matter concentrations will be relatively uniformly dispersed throughout the space.

Figure 5A:
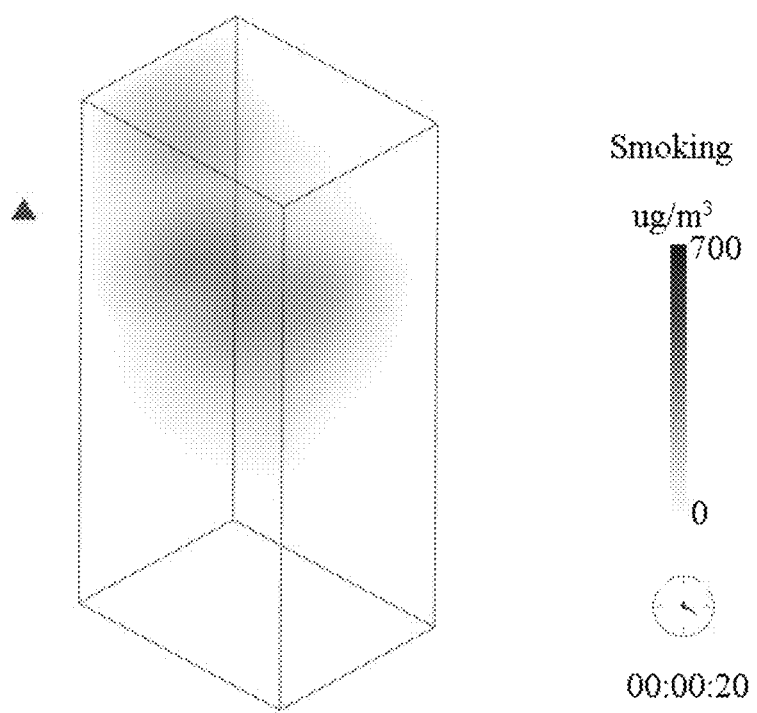
FIGS. 5(a), 5(b), 5(c), 5(d), 5(e) and FIG. 5(f) are 3D distribution diagrams and 2D slice diagrams of $PM_{2.5}$ concentration at a specific time in a smoking scene according to the embodiment of the present disclosure.
Figure 5B:
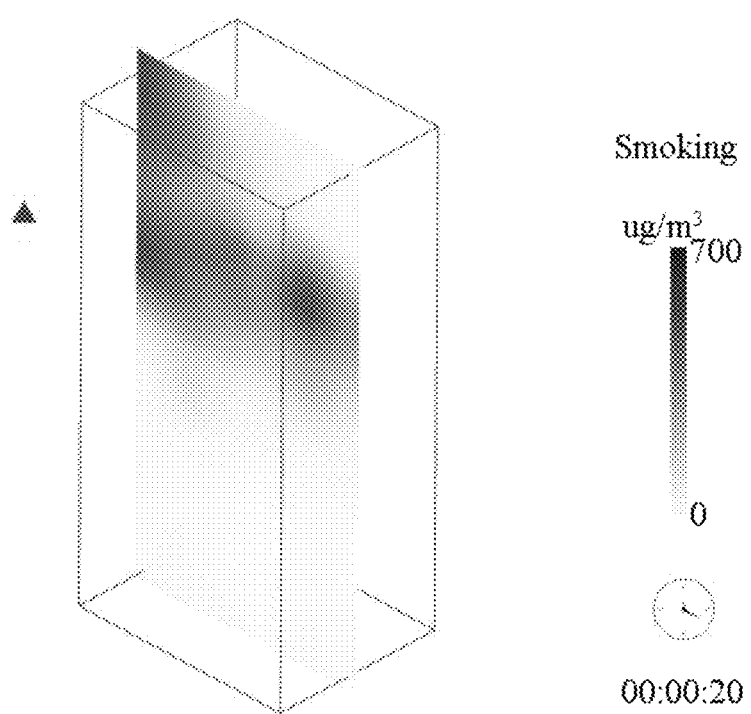
Figure 5:
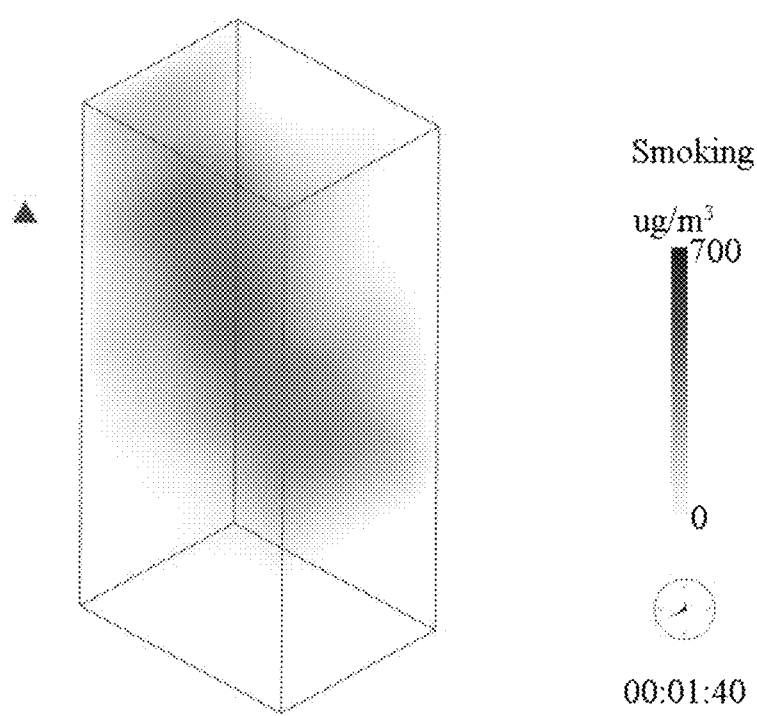
Figure 5:
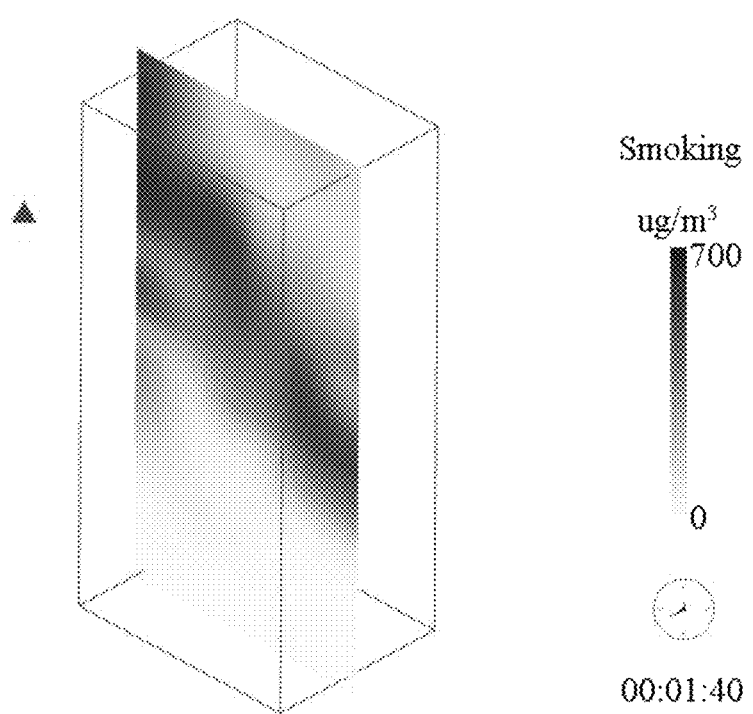
Figure 5:
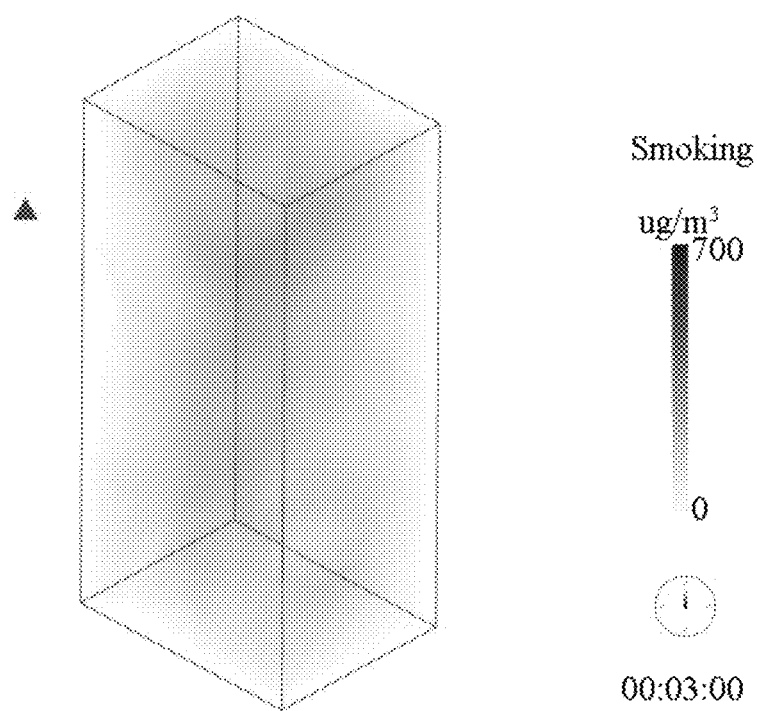
Figure 5:
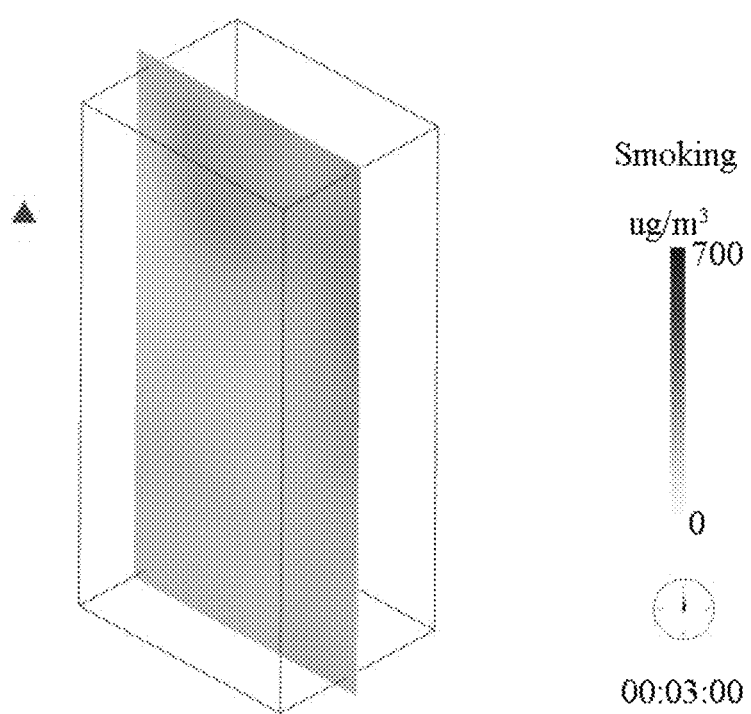
Figure 6:
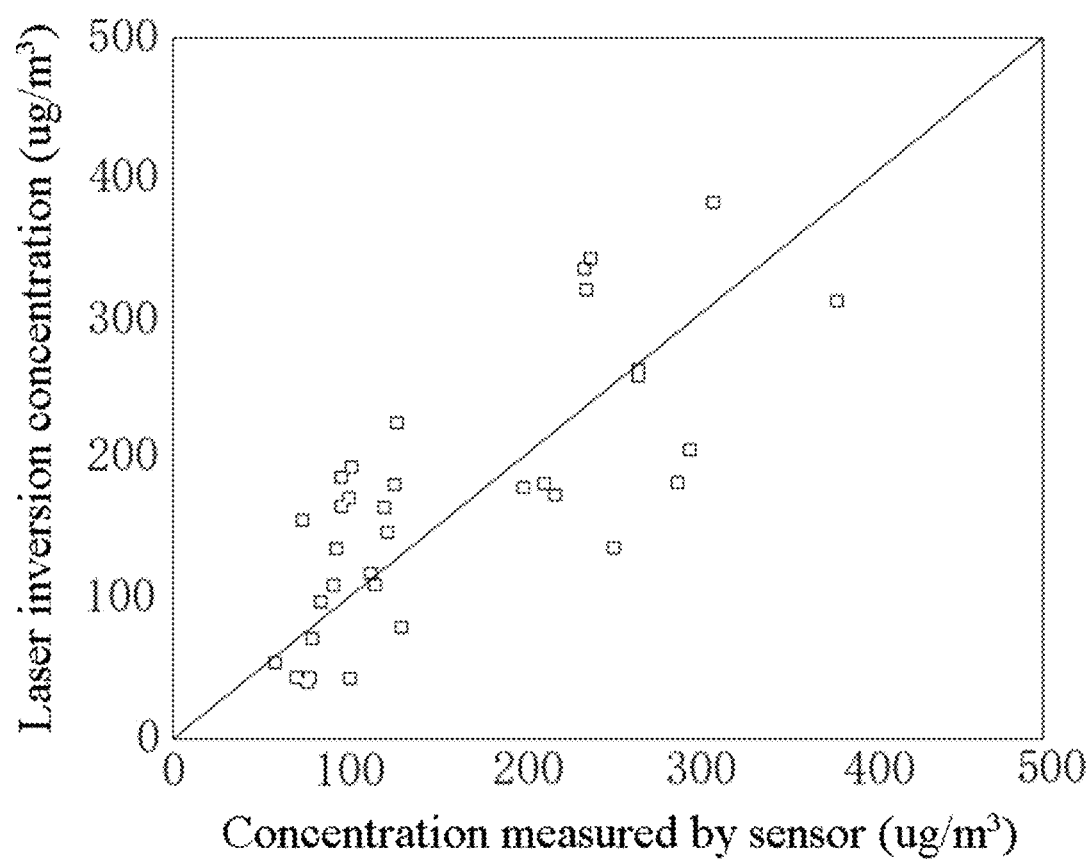
FIG. 6 is a graph showing the accuracy verification results of laser matrix inversion data according to the embodiment of the present disclosure.

The three-stage diagram is shown in FIG. 5, in which FIG. 5(a) and FIG. 5(b) are schematic diagrams showing rise of the particulate matter under heat, FIG. 5(c) and FIG. 5(d) are schematic diagrams showing oblique downward horizontal diffusion under the influence of gravity, and FIG. 5(e) and FIG. 5(f) are schematic diagrams of relatively uniform dispersion throughout the space. FIG. 6 shows consistency check between the laser matrix inversion data and the $PM_{2.5}$ measurement equipment. The normalized mean bias (NMB) is 0.51%, indicating that the system has good accuracy.

Each embodiment of the present specification is described in a progressive manner, each embodiment focuses on the difference from other embodiments, and the same and similar parts between the embodiments may refer to each other.

In this specification, some specific examples are used for illustration of the principles and implementations of the present disclosure. The description of the foregoing embodiments is used to help illustrate the method of the present disclosure and the core ideas thereof. In addition, those of ordinary skill in the art can make various modifications in terms of specific implementations and the scope of application in accordance with the ideas of the present disclosure. In conclusion, the content of the present description shall not be construed as limitations to the present disclosure.

What is claimed is:

1. A method for capturing movement trajectories of particulate matter, applied to a system for capturing movement trajectories of particulate matter, said system comprising:
   micro lidar measurement equipment and a camera, wherein
   the micro lidar measurement equipment comprises: a laser device, a pitching platform, and a protective casing for the laser device, and the laser device is located on the pitching platform;
   the laser device is configured to emit a laser; and
   the camera is configured to project the laser, and determine particulate matter concentrations by referencing a grayscale of pixels and a height of the pixels in one or more images;
   said method comprising:
   obtaining scattered light images of the particulate matter by the camera;
   performing a distance calibration on the scattered light images of the particulate matter;
   extracting grayscale pixels at different heights in a laser light path from the calibrated scattered light images of the particulate matter;
   building a particulate matter concentration prediction model; wherein an expression of the particulate matter concentration prediction model is as follows:

$C = p0 + p1 \times H + p2 \times G + p3 \times (H)2 + p4 \times H \times G$, and C represents the particulate matter concentration, H represents an attenuation distance, G represents the grayscale, and p0, p1, p2, p3 and p4 are all constants;
   predicting particulate matter concentrations based on the particulate matter concentration prediction model; and
   determining the movement trajectories of the particulate matter based on differences in spatial distribution of particulate matter concentrations at different times.

2. The method for capturing movement trajectories of particulate matter according to claim 1, wherein a plurality of laser devices are arranged on the pitching platform to form a laser array.

3. The method for capturing movement trajectories of particulate matter according to claim 2, further comprising: providing a black background cloth, wherein the black background cloth is positioned behind and above the laser array.

4. The method for capturing movement trajectories of particulate matter according to claim 2, further comprising: providing on-line particulate matter (PM) sensors, which are vertically placed at four vertices of the laser array.

5. The method for capturing movement trajectories of particulate matter according to claim 1, wherein the laser device emits a laser at a wavelength of 532 nm.

6. The method for capturing movement trajectories of particulate matter according to claim 1, wherein the camera is a complementary metal oxide semiconductor (CMOS) camera.

* * * * *